United States Patent [19]

Pfalzgraf

[11] Patent Number: 4,784,536
[45] Date of Patent: Nov. 15, 1988

[54] DRILLING HEAD

[76] Inventor: Emile Pfalzgraf, 7, rue de Neuwiller, 67330 Bouxwiller, France

[21] Appl. No.: 724,297

[22] Filed: Apr. 17, 1985

[30] Foreign Application Priority Data

Apr. 24, 1984 [FR] France .............................. 84 06903
Sep. 13, 1984 [FR] France .............................. 84 14315

[51] Int. Cl.⁴ ...................... B23B 29/034; B23B 29/08
[52] U.S. Cl. .................................. 408/187; 408/146; 408/186; 408/239 A; 279/8
[58] Field of Search .............. 408/116, 146, 153, 181, 408/184, 185, 187, 188, 239 A, 238, 173, 179, 180, 147, 186; 279/1 D, 83, 102, 8, 5; 409/234

[56] References Cited

U.S. PATENT DOCUMENTS

| | | | |
|---|---|---|---|
| 2,282,919 | 5/1942 | Zempel | 408/179 |
| 2,398,491 | 4/1946 | Bell | 408/181 |
| 2,676,809 | 4/1954 | Smith | 279/83 |
| 3,067,636 | 12/1962 | Breuning | 408/185 |
| 3,069,932 | 12/1962 | Sweeny | 408/185 |
| 3,635,572 | 1/1972 | Robinson | 408/181 |
| 4,398,854 | 8/1983 | Pape et al. | 408/181 |

FOREIGN PATENT DOCUMENTS

| | | | |
|---|---|---|---|
| 815754 | 8/1951 | Fed. Rep. of Germany . | |
| 885951 | 6/1953 | Fed. Rep. of Germany . | |
| 2411394 | 9/1975 | Fed. Rep. of Germany . | |
| 2813575 | 10/1978 | Fed. Rep. of Germany | 408/181 |
| 2918243 | 11/1979 | Fed. Rep. of Germany . | |
| 3037566 | 6/1981 | Fed. Rep. of Germany . | |
| 3044862 | 9/1981 | Fed. Rep. of Germany . | |
| 3049026 | 9/1981 | Fed. Rep. of Germany . | |
| 3121907 | 5/1982 | Fed. Rep. of Germany . | |
| 3237128 | 4/1984 | Fed. Rep. of Germany | 408/239 R |
| 3312990 | 10/1984 | Fed. Rep. of Germany | 408/147 |
| 2117330 | 7/1972 | France . | |
| 2290979 | 6/1976 | France | 408/181 |
| 437042 | 6/1948 | Italy | 408/184 |
| 1309732 | 3/1973 | United Kingdom | 408/188 |

*Primary Examiner*—Gil Weidenfeld
*Assistant Examiner*—Daniel W. Howell
*Attorney, Agent, or Firm*—Young & Thompson

[57] ABSTRACT

Drilling head characterized in that it is essentially constituted by a body (1) mounted on a support (2) which is provided with a securement shank, cylindrical or of modular type or the like, or with a shank adaptable directly to machines, or with a shank with attachment to the Morse cone or American cone, or else to a threaded TR shank, or the like, to which it is rigidly secured by an assembly screw (3), by indexing structure (4) in all positions of the body (1) relative to the support (2), and by an adjustable support and displacement assembly (5) of the cutting tool (6) in a direction perpendicular to the axis of the body (1).

11 Claims, 9 Drawing Sheets

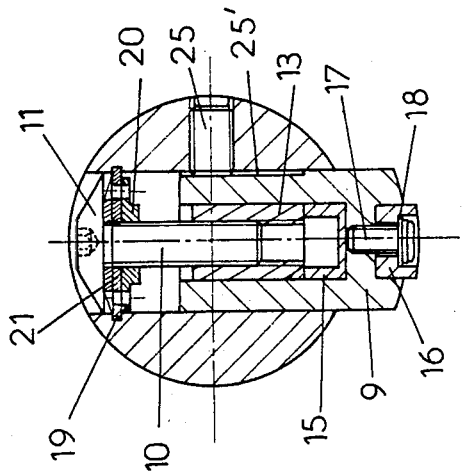
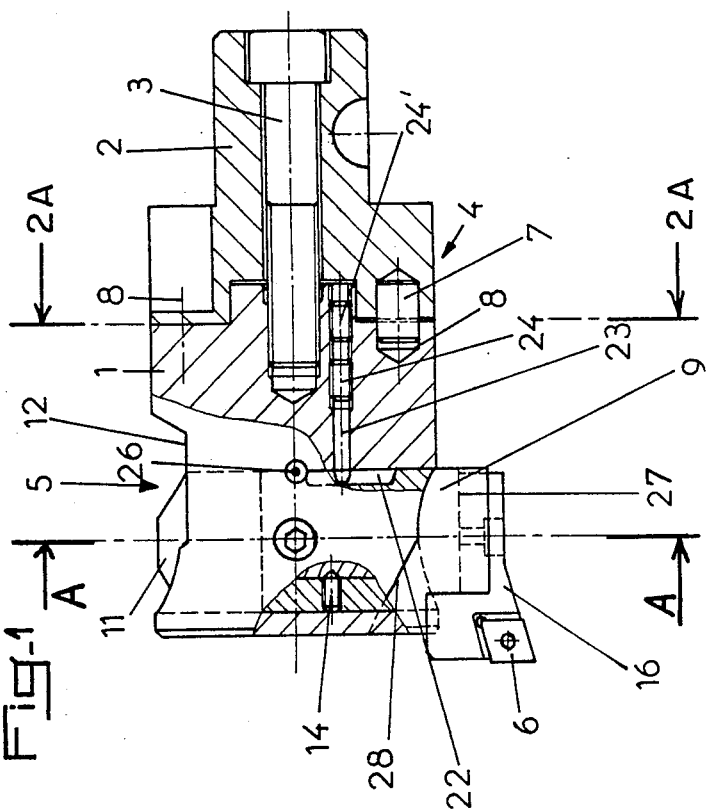

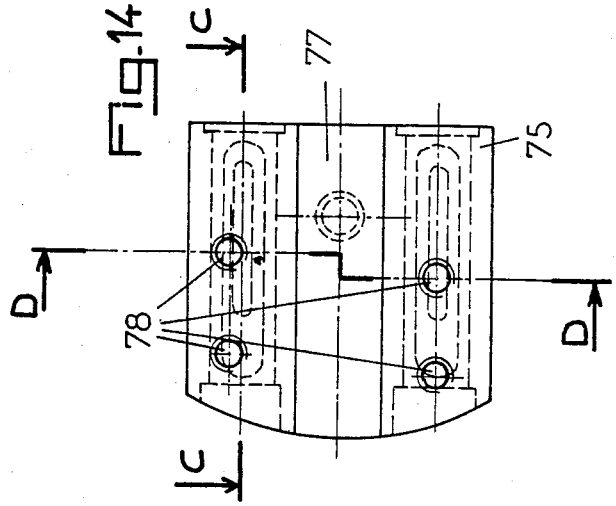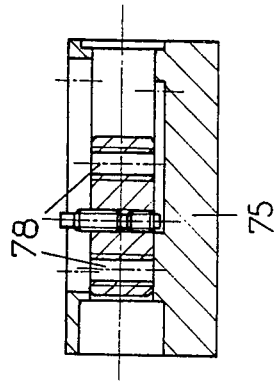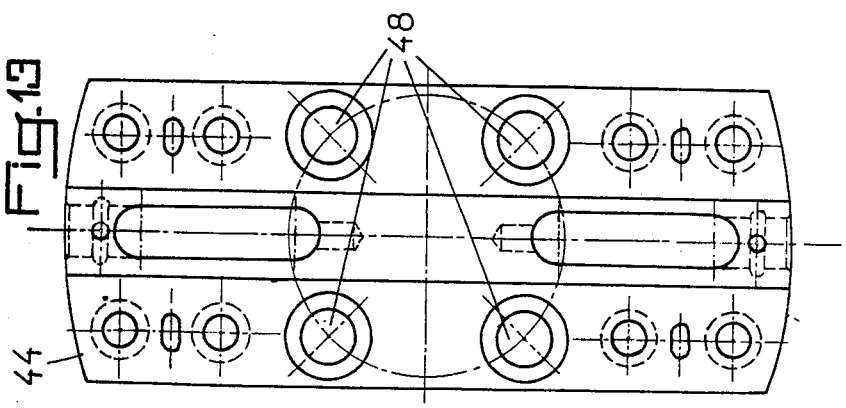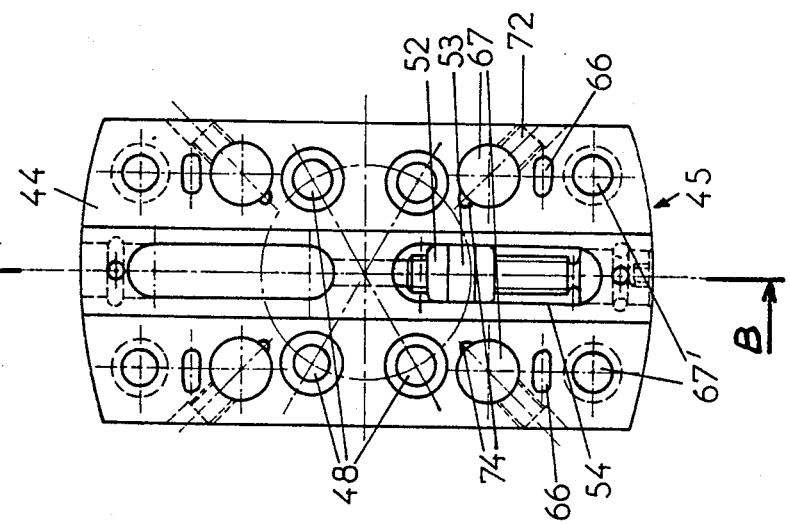

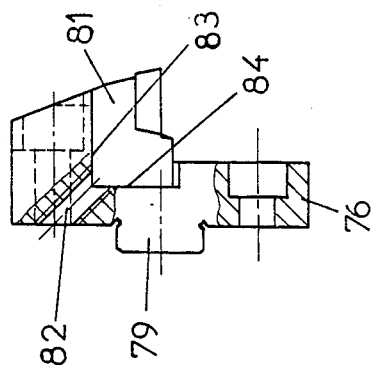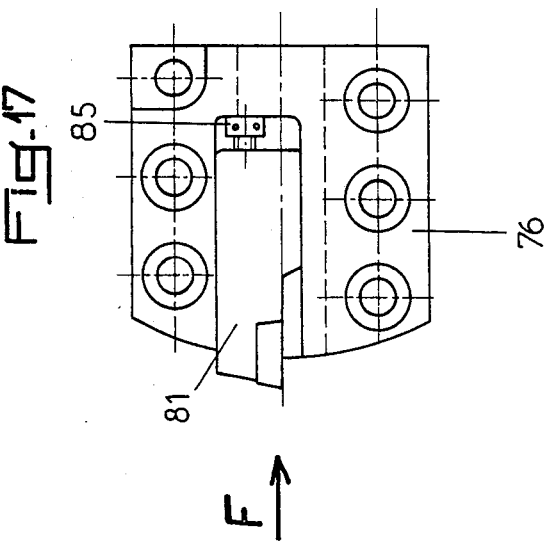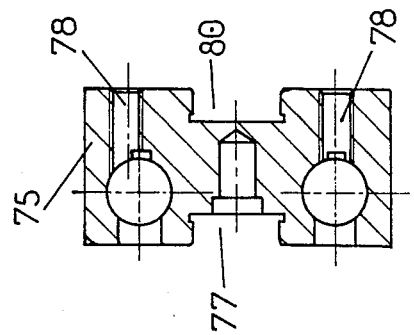

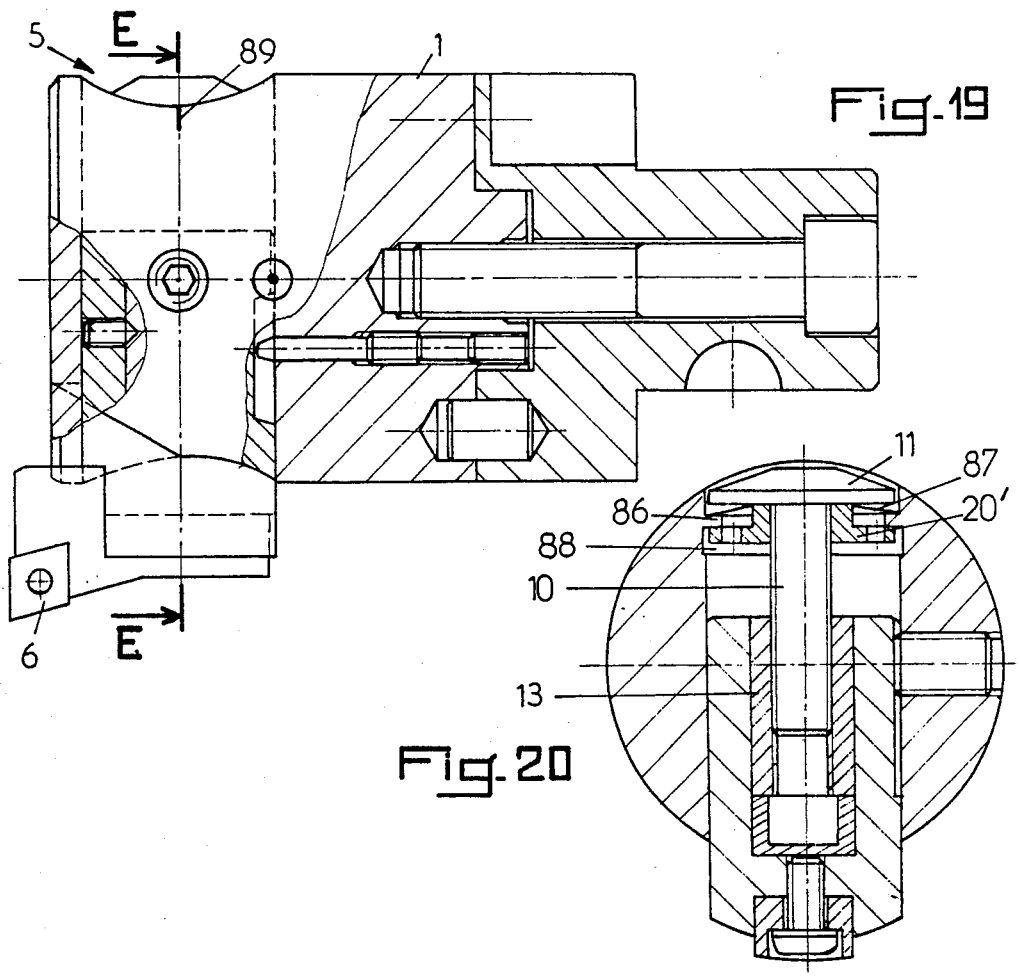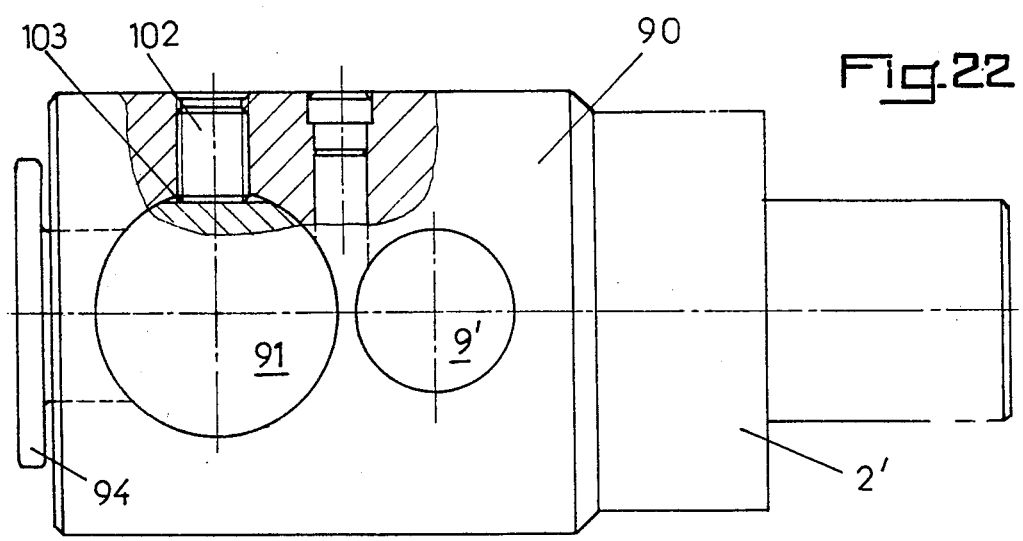

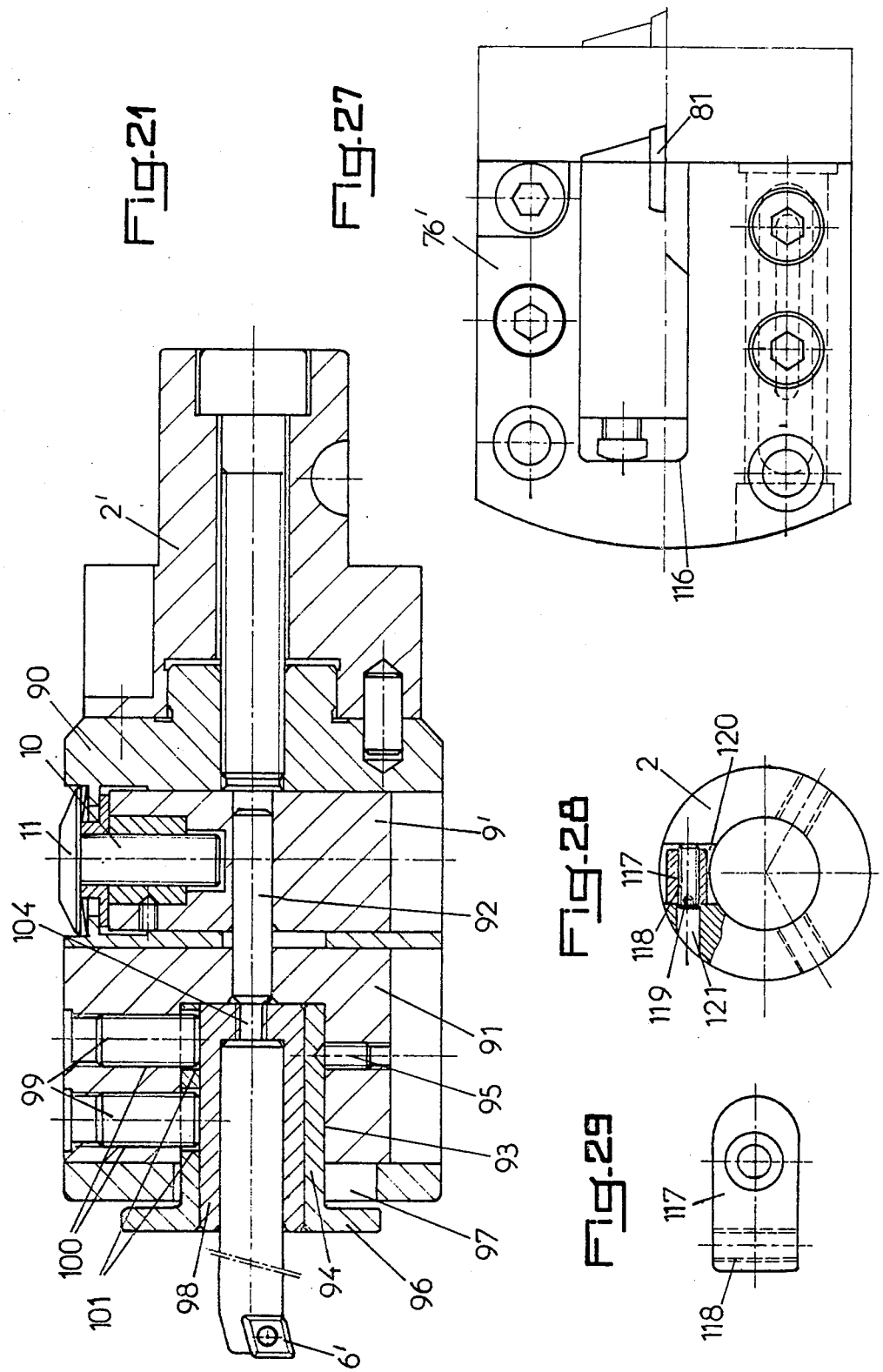

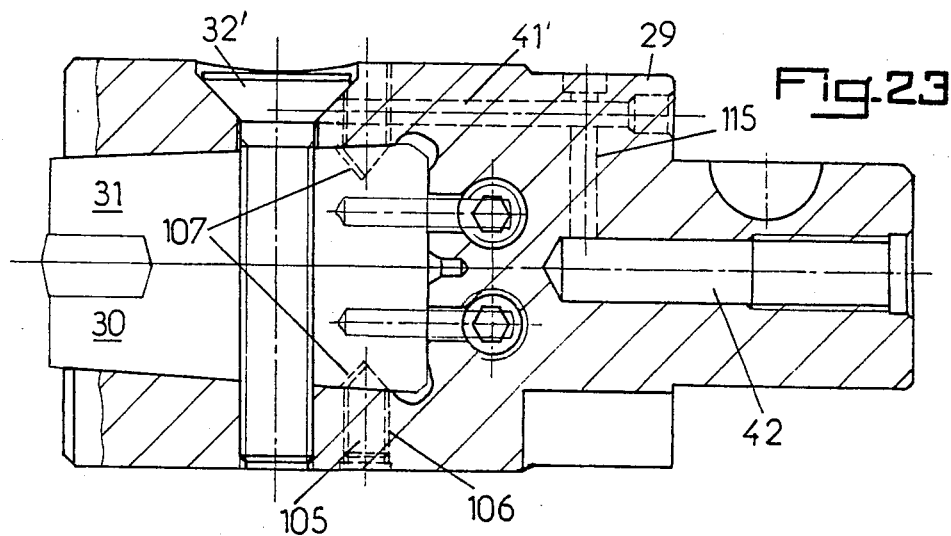
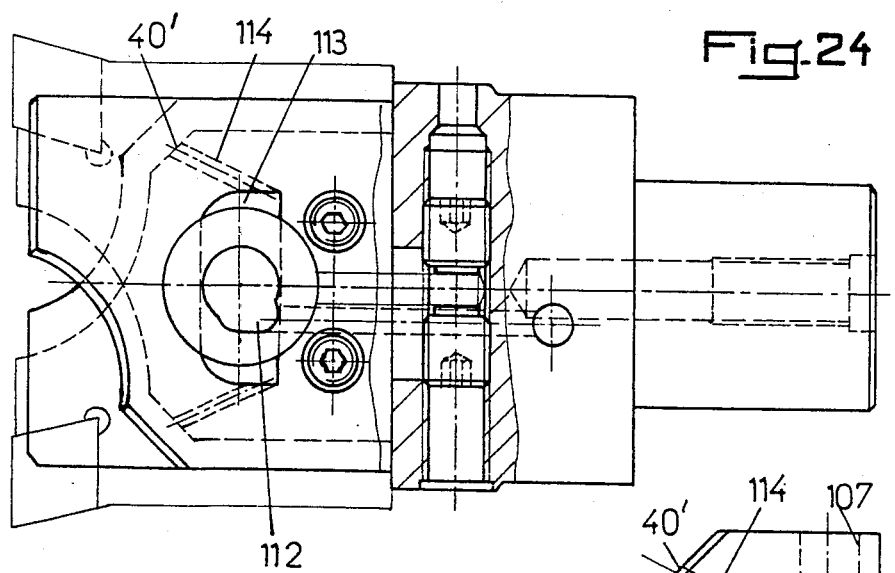
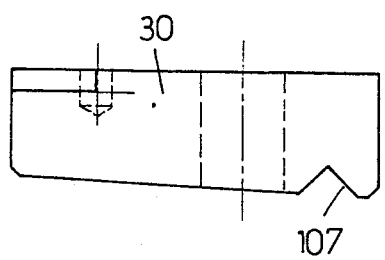
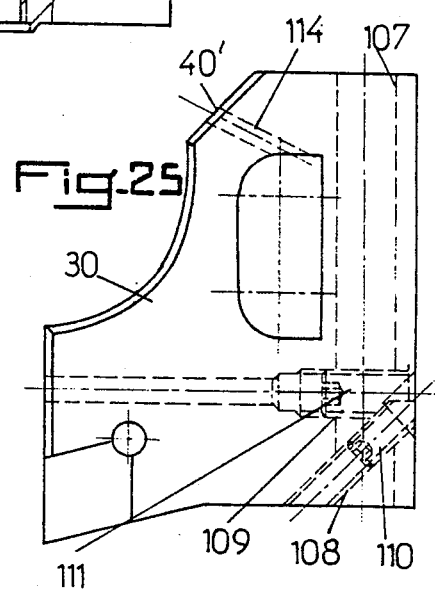

DRILLING HEAD

The present invention relates to the field of machining by drilling using conventional or numerically controlled machines, in machine shops or by means of equipment in general purpose establishments, and has for its object a drilling head.

According to the invention, the drilling head is essentially constituted by a body mounted on a support provided with a securement shank, by a screw for assembling the body with the support, by an indexing means for the body relative to the support, and by an adjustable support and displacement assembly for the cutting tool perpendicular to the axis of the body.

The invention will be better understood from the following description, which relates to preferred embodiments, given by way of non-limiting examples and explained with reference to the accompanying schematic drawings, in which:

FIG. 1 is an elevational side view partially in section of a drilling head according to the invention;

FIG. 2 is a cross-sectional view on A—A of FIG. 1;

FIG. 10 is a front elevational view of a securement sole;

FIG. 13 is a front elevational view of a modified form of the sole;

FIG. 14 is a front elevational view of a modified form of a body;

FIG. 15 is a cross-sectional view on C—C of FIG. 14;

FIG. 16 is a cross-sectional view on D—D of FIG. 14;

FIG. 17 is a view similar to FIG. 14 of another form of embodiment of the body;

FIG. 18 is a partial cross section on F of FIG. 17;

FIG. 19 is a side elevational view partially in section of a modified form of the drilling head according to the invention;

FIG. 20 is a cross-sectional view on E—E of FIG. 19;

FIG. 21 is a side elevational view in section of a modified form of the invention;

FIG. 22 is a plan view partially in section on FIG. 21;

FIG. 23 is a view similar to that of FIG. 19 of another modified form of the invention;

FIG. 24 is a plan view partially in section on FIG. 23;

FIG. 25 is a plan view of a plate holder according to the invention;

FIG. 26 is a front elevational view of FIG. 25;

FIG. 27 is a front elevational view of a modified form of a body;

FIG. 28 is a rear elevational view, partially in section, of the support of a body, and FIG. 29 is a plan view of a driving lug.

Figure 2A:
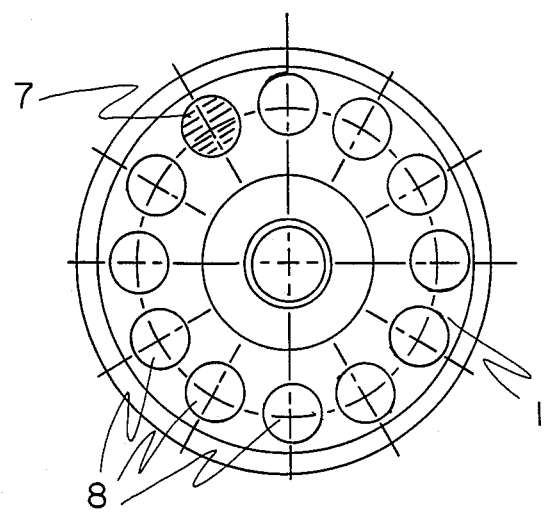
FIG. 2A is a cross sectional view on the line 2A—2A of FIG. 1.

According to the invention, and as is shown more particularly, by way of example, in FIGS. 1 and 2 of the accompanying drawings, the drilling head is essentially constituted by a body 1 mounted on a support 2 to which it is rigidly secured by an assembly screw 3, by indexing means 4 in all positions of body 1 with respect to support 2, and by an adjustable supporting and displacing assembly 5 of the cutting tool 6 in a direction perpendicular to the axis of body 1.

The support 2 is provided with a securement shank, cylindrical or of modular type or another type (shown in the figure), or with a shank directly applicable to the machines, or with a shank for attachment to a Morse cone or an American cone, or else with a threaded TR shank, or the like.

The indexing means 4 for the body 1 relative to the support 2 is constituted by a cylindrical stud 7 secured to support 2 and adapted to coact with holes 8 of corresponding diameter disposed at regular intervals on the rear face of body 1, these holes 8 being preferably twelve in number and spaced 30° apart. This indexing means permits adjusting the angular position of the tool 6 to the best position, within 15°, when the spindle is stopped, to begin or end the machining operations.

Indexing may also be effected by the provision of friction regions between body 1 and support 2, by notching, by teeth, or the like.

The adjustable support and displacement assembly 5 of the tool 6 is constituted by a piston 9 slidably mounted with very close tolerance in a bore extending perpendicularly to the axis of body 1 near its forward end, and actuated by means of a micrometer screw 10 of fine thread, which, on the one hand, is provided with a wide head 11 with inclined flanks, whose center is provided with a hexagonal operating socket, and whose inclined flanks have graduations cooperating with graduations provided on a flat 12 on body 1, and, on the other hand, cooperates with a screw nut 13 secured to piston 9 by cementing, a set screw 14 ensuring its final gripping, this nut 13 being positioned in piston 9 by means of an abutment 15 simultaneously closing the recess for the nut opposite the screw 10 as well as a threaded hole serving for the securement of a plate holder 16 of the tool 6 in the form of a plate by means of a screw 17 and a ring 18.

Thanks to the graduations provided on the micrometer screw 10 and on the flat 12 of the body 1, it is possible to control exactly the advance of the piston 9 and therefore of the tool 6, for example within 0.01 mm of diameter.

Nut 13 is not mounted in locked position so as to avoid any deformation during its introduction into the piston 9, and the abutment 15 serves, on the one hand, to bear against nut 13, and, on the other hand, to avoid any entry of foreign material into nut 13 and the ultimate damage to the micrometer screw threading by such material.

The support of screw 10 in body 1 is ensured by a resilient member 19 fixed in a groove in the bore of the body 1, by a counternut 20, and by a cross member 21 whose thickness is slightly greater than that of member 19 so as to permit reduction to the minimum of the mounting play of the screw 10. According to a modified form of the invention, not shown in the accompanying drawings, so as to avoid any play during operation, a compressible washer of the Belleville type is inserted in the mounting between the elastic member 19 and the inner face of the head of the screw 10, with adjustable compression, preferably of two-thirds, the thickness of the cross member 21 being thus equal to that of the member 19 increased by that of the compressed washer.

The support and guidance of the piston 9 in its bore are ensured by a conical groove 22 provided along one generatrix and coacting with a machined pin 23 with a conical end, whose bearing pressure in groove 22 is adjusted by means of a screw 24, a second screw 24' secured in the screw threading ensuring the invariability of the adjustment, and by a screw 25 for blocking the piston in position, which bears on a flat 25' of piston 9.

Thus, the displacement of piston 9 may be precisely controlled without the possibility of circular movement and its setting in position is ensured by the screw 25.

The lubrication of the piston in its bore is effected by means of a grease cap 26 whose outlet opening is preferably tangent to the bore at the level of the axis of body 1, whereby a small space is provided permitting the lubrication of the assembly.

At its free end, piston 9 is provided with a groove 27 for receiving the plate holder 16, which is maintained applied during the work operation against a recess 28 provided in the free end of body 1.

The plate holder may be secured and centered in the piston 9, in any other manner, namely by cross centering, or the like, and all types of plates or bits may be mounted on said plate holder 16.

According to a modified form of the invention, not shown in the accompanying drawings, the piston 9 may also be provided with a longitudinal recess extending along a generatrix, provided with the impression of the interval of the micrometer screw 10, and adapted to coact with this latter, which therefore has a greater diameter and extends tangentially of the piston 9.

According to another unillustrated modified form of the invention, the piston 9 is in the form of a member with a round shank, a polygonal member, or with a toothed or grooved profile, the screw 10 coacting with a nut secured on the upper part of the piston.

Figure 3:
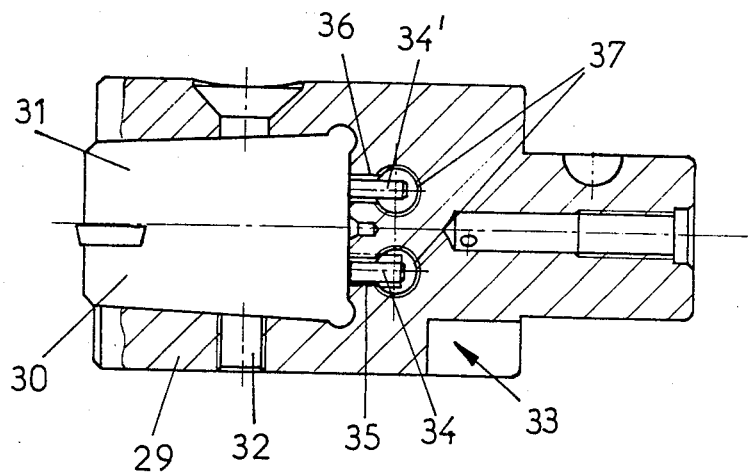
FIG. 3 is a view similar to that of FIG. 1 of a modified form of the invention.
Figure 4:
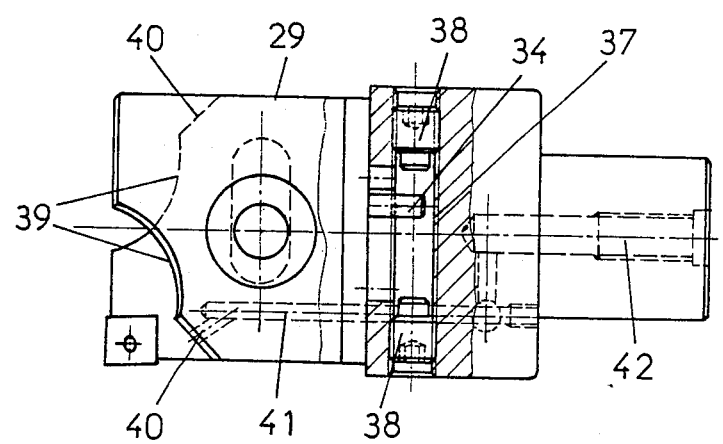
FIG. 4 is a plan view partly in cross section of FIG. 3.
Figure 5:
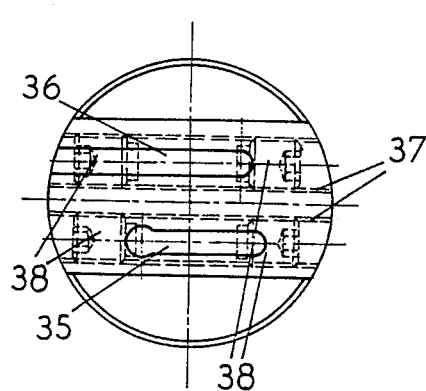
FIG. 5 is a front elevational view on FIG. 3.
Figure 6:
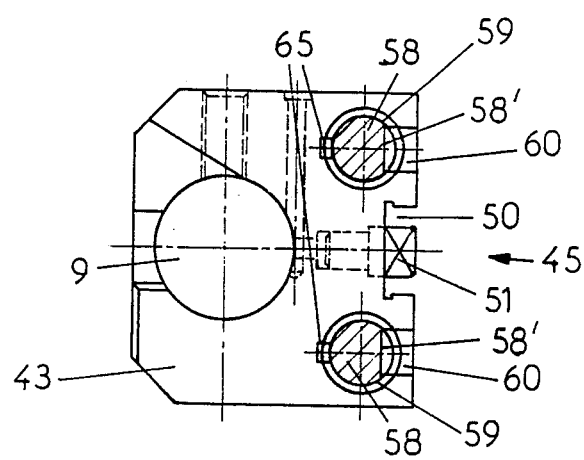
FIG. 6 is a plan view of a modified form of the body of the drilling head of FIG. 1.
Figure 7:
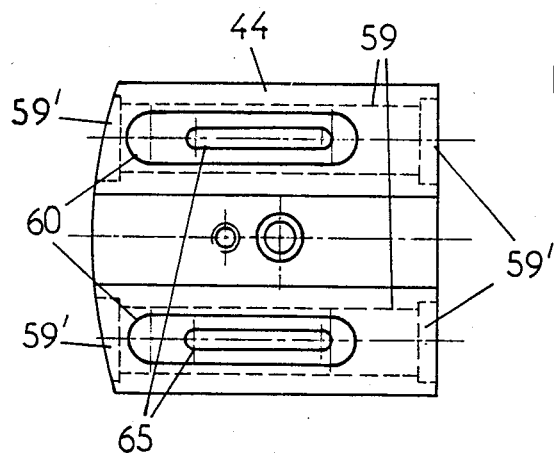
FIG. 7 is a rear elevational view of FIG. 6.
Figure 8:
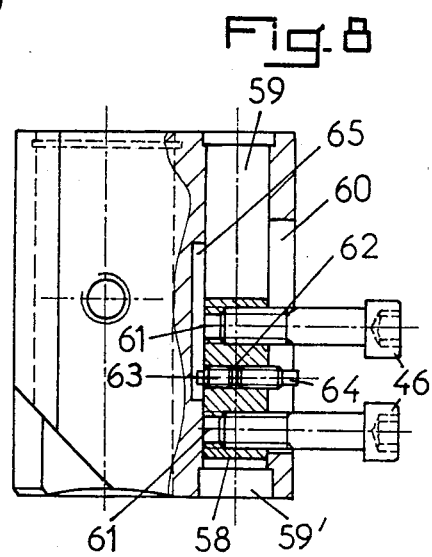
FIG. 8 is a side elevational view of FIG. 6.
Figure 9:
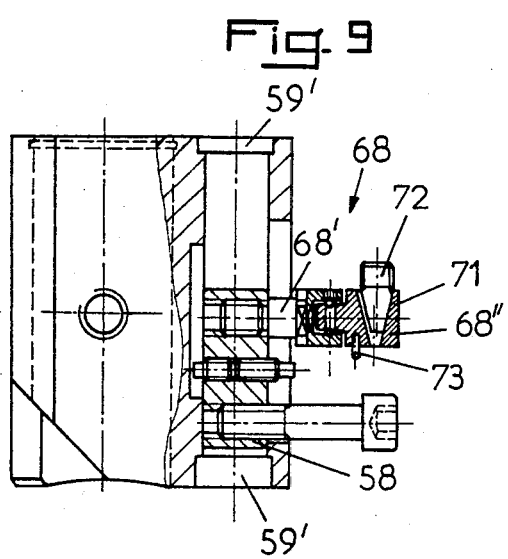
FIG. 9 is a view similar to that of FIG. 8 of a modified form of the mounting of the body.
Figure 11:
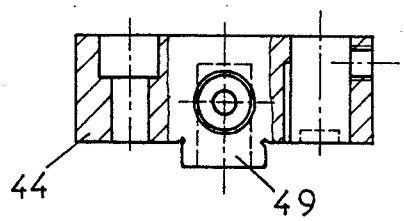
FIG. 11 is a plan view, partially in section of the sole.
Figure 12:
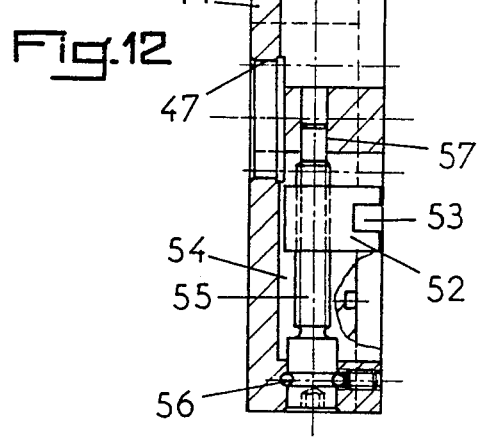
FIG. 12 is a cross-sectional view on B—B of FIG. 10.

According to another modified form of the invention, and as shown in FIGS. 3 to 5 of the accompanying drawings, for rough work, the drilling head is constituted by a body 29 having at its rear portion a securement shank, or the like, and at its forward portion an open recess having sides preferably slightly inclined and widening in the direction of the shank, or sides parallel to the axis provided with grooves, or perpendiuclar guide teeth, or the like, by plate holders 30 and 31 disposed in a positionally adjustable manner in the body 29, by a set screw for the plate holders 30 and 31 between the sides of the recess, coacting with a tapped hole 32 on one side of said recess and passing through the other side as well as a transverse groove of the plate holders, and by means 33 for adjusting the plate holders.

Such a drilling head requires no indexing by virtue of the fact that it works with two tools, but should be built stronger than the previously-described head. Similarly, the precision of adjustment may be less, but the two plate holders should be separately adjustable.

To this end, the means 33 for adjustment of the plate holders 30 and 31 is constituted by two rods 34, 34' each secured to a plate holder 30 and 31 and extending through two parallel grooves 35 and 36 in two tapped holes 37 passing through the body 29 from side to side, one of the grooves 36 being open at one end (FIG. 5), and the other groove 35 being closed, and the transverse extent of said grooves is defined by the length of adjustment of the plate holders 30 and 31, and by two pairs of screws 38 engaged in the tapped holes 37 to displace the rods 34 and 34' from the two sides of the holes 37.

The closed groove 35 is provided for the insertion of the first plate holder 30 on the forward face of body 29, while the other groove 26 is adapted to permit mounting of the second plate holder 31 by simple lateral encasing.

The recess of body 29 has, in known manner, at its bottom, along its sides, recesses adapted to facilitate the machining of its walls.

When the adjustment of the plate holders 30 and 31 is effectuated, the set screw is fixed in the hole 32 so as to clamp said plate holders, and the screws 38 are then applied on opposite sides against the respective rods 34 and 34', exactly supporting the plate holders 30 and 31 in position.

Of course, the displacement of the plate holders may also be effectuated in other ways, for example by means of screws coacting directly with the plate holders, or the like.

At its forward part, the body 29 has on each side a recess 39 permitting easy evacuation of cuttings, as well as an inlet opening 40 for cooling lubricant, which arrives through a passage 41 connected to a central rear passage 42. Other arrangements of the lubrication passages are possible, particularly with lubricant supply at the bottom of the recess and passage through the plate holders, or else lubricant injection by a transverse hole perpendicular to the axis of the body, etc.

According to another characteristic of the invention, a third plate holder, not shown, can be mounted in place of one of said first plate holders 30 and 31 and present a tool offset longitudinally with respect to the other tool so as to provide a different cut and a division of the width of the cuts. Thus, one obtains better distribution of the cutting force, and the central lubrication improves the ejection and evacuation of the chips.

Such an arrangement of rough boring head permits obtaining great strength of said head as well as simple and easy adjustment and effective clamping of the plate holders.

For the formation of large diameter bores, the drilling head is constituted, as shown in FIGS. 6 to 13 of the accompanying drawings, by a body 43 of the same arrangement as body 1 of FIGS. 1 and 2 as to its adjustments, the piston 9, the securement and the plate holders, by a sole 44 (FIGS. 10 to 13) for securement and guidance of the body 43 by means of screws 46, mounted with the possibility of indexing on an attachment (not shown), and by means 45 for guided displacement of body 43.

Sole 44 is provided with a centering bore 47 on a hub corresponding to an attachment, known per se, this attachment being provided moreover with regularly spaced holes on a diameter and adapted to coact with the screws 48 for the securement and indexing of the sole 44. The attachment holes are advantageously spaced apart 30°.

Sole 44 is provided on its face turned toward body 43 with a longitudinal tongue 49 (FIG. 11) adapted to coact with a corresponding centering groove 50 of body 43, and permitting a guided displacement of said body 43 on sole 44.

Means 45 for guided displacement of body 43 is constituted by a driver 51 having two parallel flats (FIG. 6) and secured in the body 43, on the axis of groove 50, by a nut 52 provided with a transverse groove 53 adapted to coact with the driver 51, guided in translation in a groove 54 of the sole 44, and driven by an adjustment screw 55, which is steadied in its translatory movement by balls 56 riding in a groove, and guided at its other end in a recess 57 of the sole.

The support and guidance and displacement of the body 43 on the sole 44, during adjustment, are ensured moreover by two members 58 mounted slidably in two holes 49 in body 43 and extending parallel to the centering groove 50, these holes being connected to the application surface of body 43 on the sole 44 each by a groove 60 for passage of securement screws 46, which are screwed in tapped holes 61 extending perpendicular to the axis of said members 58, which have along all their length, on the side of screw 46, a flat 58' and the holes 59 are closed, after mounting the members 58, by plugs cemented in counterbores 59' provided at their ends.

Between the tapped holes 61 is provided a supplemental tapped hole 62 oriented in the same direction as the holes 61, but preferably of smaller diameter, into which extend two screws 63 and 64, of which one, 63, coacts with a groove 65 in the body 43 and prevents rotation of the corresponding member 58 in its recess and forms a stop for the displacement of body 43 on sole 44, while the other, 64, turned toward sole 44, extends beyond the corresponding face of said body 43 and coacts with a corresponding groove 66 of sole 44 to position body 43 on said sole 44 during mounting, whereby the tapped holes 61 of the members 58 are aligned with those 67 and 67' of the sole 44 (FIG. 10).

Thanks to this arrangement, two modes of displacement may be provided for the tool, namely a rapid displacement by means of the adjustment screw 55 disposed in the sole 44, and a micrometric displacement by means of the screw actuating the piston 9. The displacement of body 43 is possible only after slight release of the mounting and blocking screws of the body 43 on the sole 44. During displacements and adjustments of body 43, only this latter is displaced relative to the space remaining available in the holes 59 of the members 58.

The end of travel stops of body 43 are constituted, on the one hand, by the head of the screw 55, and, on the other hand, by the end of the groove 60 which coacts in its end positions, respectively with the nut 52 and with the screw 46.

Sole 44 is provided with at least two assemblies of nut 22-adjustment screw 55 and holes for mounting and set screws 46.

The securement of the sole on its attachment can also be effected by a round shank, by a straight tooth, or the like. Similarly, the guidance of body 43 on sole 44 can be effected by other centering and guiding means.

In the case of drilling heads of medium diameter not permitting direct securement of the body 43 on the sole 44 by means of screw 46, because of the size of the attachment, there are provided two screws 68 (FIG. 9) having a portion 68' provided with screw threading entering in a hole 61 of a member 58 and a male portion 68" entering a bore of the portion 68' directed toward the sole 44, this portion 68" being retained in its bore by a connecting groove and balls 69 permitting pivoting of the portion 68" after gripping the part 68' in the member 58 by means of two flats 70 on the portion 68', and the portion 68" is provided, near its free end, with a conical hole 71, perpendicular to its axis, and into which extends a conical ended screw 72 secured in the sole 44 and whose axis is offset relative to that of the hole 71, and in the prolongation of the hole 71 is secured, with slight offset in the direction of the body 43, a pin 73 permitting centering of the base of the screw 68 during its introduction into the hole 67 corresponding to the sole 44 (FIG. 10) by cooperation with a groove 74 of said hole 67.

Thus, when the conical end of the screw 72 enters the hole 71, the securement screw 68' is gripped in the sole 44.

FIGS. 14 to 18 show another modified form of the invention, in which the body is in the form of an intermediate support block 75 (FIGS. 14 to 16) or of an upper support block 76 (FIGS. 17 and 18), the intermediate block 75 being secured in adjustable fashion on the sole 44, centered on this latter by means of a groove 77, and provided with threaded holes 78 for the reception of securement screws of the upper block 76, which is guided on the intermediate block 75 by means of a tongue 79 coacting with a groove 40 in said block 75, and which is provided with two supplemental recesses for securement screws permitting supplemental displacement of the block 76 on the block 75.

Heads like those described above are particularly adapted to rough bores of large diameter and the head forming the upper block 76 used as a support for plates of commercially available cartridges 81, secured generally by means of an inclined thread 82, and bearing on the perpendicular surfaces 83 and 84, a screw 85 being provided for fine adjustment from the rear.

The securement and adjustment of the body in the form of blocks 75 and 76 on the sole 44 are identical to those of bodies 29 and 43, but their design is substantially simplified.

According to another characteristic of the invention, and as shown more particularly by way of example in FIGS. 19 and 20 of the accompanying drawings, the micrometer screw 10 of fine thread, which serves to actuate piston 9 of the adjustable support and displacement assembly 5 of tool 6, is supported by means of an internal shoulder 86 machined in the housing bore of piston 9 and with a counter nut 20', which is so positioned as to abut against the head 11 of the screw 10 and to press by an enlarged edge under the shoulder 86. A compressible washer 87 bears moreover under the head 11 of the screw 10 and on the other face of the shoulder 86 to ensure, after slight compression, maintenance without play of the screw 10 in the body 1.

Thanks to this arrangement, the housing of the head 11 permits centering and positioning of the drilling head for grinding the bore of piston 9, and the precision of said drilling heads is substantially improved.

Moreover, thanks to this arrangement, the adjustable support and displacement assembly 5 of tool 6 is better sealed against any penetration by liquid.

A disengagement groove 88 provided below shoulder 86 permits the grinding of the useful portion of the housing bore of piston 9, and the positioning of the counter nut 20' with its inverted head permits increasing the length of the screw thread of nut 13 of screw 10, this nut 13 being flush with the surface of piston 9. Thus, the length of screw thread of the nut 13 in contact with the screw 10 is increased, whereby said screw thread may have a finer thread leading to improved precision and simplified reading of the scale constituted by graduations provided on the side of head 11 of the screw 10 and by a single line 89 on the body 1.

According to another modified form of the invention, and as shown in FIGS. 21 and 22 of the accompanying drawings, for fine work, particularly of small diameter, the drilling head is constituted by a body 90 mounted on a support 2' and in which are mounted slidably radially and parallel to each other, a piston 91 for supporting a tool 6' by means of a bore 93 and a piston 9' for actuating the piston 91 secured to the latter by means of a slotted pin 92 or the like, the control of the displacement of piston 9' being effectuated by a micrometer screw 10 of fine thread provided with a broad head 11.

The piston 9' and its actuating means are analogous to piston 9 in FIGS. 19 and 20 as to the adjustment and support of the screw 10 without play.

The slotted pin 92 ensures moreover the retention of the pistons 9' and 91 against undesired rotation, thanks to the bore 93 for reception of tool 6' being rigidly fixed on the axis of body 90, said tool 6' being itself aligned with this axis.

The securement of the tool 6' in bore 93 of support piston 91 is effected by means of a ring 94 mounted in the bore 93 and and maintained in place by a pointed screw 95, a shoulder 96 of this ring 94 projecting beyond body 90 and covering an opening 97 of this latter required for the movement of the tool, a split ring 98 being able to surround, if desired, the shank of tool 6', and to be secured in the ring 94 by means of screws 99 mounted in threaded holes 100 of piston 91 and passing through openings 101 of ring 94.

Piston 91 is secured in operative position by means of a pressure screw 102 fixed in body 90 and acting perpendicular to the direction of displacement on the flat 103 of the piston 91. The split ring 98 is provided with threading 104 for its extraction from the ring 94.

According to another characteristic of the invention, in the case of a drilling head intended for rough work, its body 29, containing plate carriers 30 and 31, is provided with two opposed pairs of pointed screws 105 entering threaded holes 106 of body 29 and bearing at their ends in a groove 107 provided on the corresponding surfaces of the plate carriers 30 and 31 (FIGS. 23 and 24), and at least one plate carrier is provided with a threaded hole 108 extending obliquely to its bearing face in the bottom of the recess or a threaded hole 109 perpendicular to this surface, a corresponding pointed screw 110 of a flat bottom screw 111 being mounted in the hole 108 or 109 (FIGS. 25 and 26).

The pointed screws 105 permit applying in a very precise manner the rear faces of the plate carriers 30 and 31 against the bottom of their housing in the body 29 whereby their positioning is always assured in a very precise manner. Moreover, the provision of a threaded hole 108 or 109 and of a corresponding screw 110 or 111 permits, by screwing said screw, after slight release of the corresponding screws 105, to raise and pivot slightly the plate in its housing, whereby the cut of the tool may be offset slightly in height with respect to the tool of the other plate. Thus, a supplemental plate carrier with offset tool can be avoided.

According to another characteristic of the invention, for the central lubrication of the cutting tools, there is provided in the body 29 a channel 41', which opens beneath the head of screw 31' for gripping the plate carriers 30 and 31, the housing of this head having an opening 112 placing it in communication with the transverse grooves 113 of the plate carriers 30 and 31, these grooves 113 forming a distribution chamber for the liquid and being connected each by two oblique holes 114 to outlet orifices 40'.

There is thus ensured a lubrication of the plates at the most appropriate places and permitting a complete evacuation of the cuttings.

Of course, the channel 41 may be connected to a central rear feed channel 42 in known manner by a channel 115 perpendicular to the axis.

According to another modified form of the invention, for rough machining bores of large diameter, an upper support block 76' (FIG. 27), is provided with a groove 116, whose opening is to the interior side of the block, whereby a plate tool 81, which is mounted there, may be displaced in the direction of this side by means of its adjustment screw of the block 76'. Thanks to this embodiment it is possible to effect with the upper block 76' turning operations.

According to another characteristic of the invention, to ensure securement without self gripping of the modular shank of the support 2 in its attachment, or other female reception member, there is provided a removable pin 117 mounted in the attachment by means of a sunken head screw and provided with a tapped hole 118 extending transversely of the pin, and in which is secured a screw 119, which bears by its end on one of the faces of housing 120 of support 2, pushing by reaction the opposite face of pin 117 against the other surface of the housing 120, a passage hole 121 being provided to one side of the housing for the passage of the tool to manipulate the screw 119.

This embodiment of connection of the support 2 with the drive device permits avoiding possible vibrations due to unlocking the self-lock, particularly as a result of discontinuous cutting operations by stamping. Thus, in such a case the repeated shocks result, in known device, in continuous displacement of the pin in the two directions, in its housing, effecting a loosening of the set screw.

According to another characteristic of the invention, not shown in the accompanying drawings, the pin has a width equal to that of the housing of the support 2 and the spherical housings of the shank of this latter are slightly offset relative to their corresponding clamping screw. Thus, the clamping of one or the other screw results immediately in a slight rotation of the support 2, which has as a consequence strongly applying the corresponding surface of the pin against the surface of its housing. Such an embodiment is particularly adapted to the execution of very hard work.

Of course, the invention is not limited to the embodiments described and shown in the accompanying drawings. Modifications remain possible, particularly as to the construction of the various elements, it being possible to substitute technical equivalents, without thereby departing from the scope of protection of the invention.

What is claimed is:

1. Drilling head comprising a body (1) mounted on a support (2) which is provided with a securement shank to which support said body is rigidly secured by an assembly screw (3), indexing means (4) for selectively interconnecting said body and said support in any selected one of a plurality of predetermined positions of rotation relative to each other, said perdetermined positions of rotation being spaced apart from each other by an acute angle, and an adjustable support and displacement assembly (5) for a cutting tool (6), said assembly being mounted on said body for movement relative to said body in a direction perpendicular to the axis of rotation of the body and support relative to each other, the indexing means (4) for the body (1) relative to the support (2) comprising a cylindrical lug (7) secured to one of the body (1) and the support (2) and adapted to cooperate with any selected one of a plurality of holes (8) of corresponding diameter disposed at regular intervals on the adjacent face of the other of the body (1) and the support (2), these holes being spaced apart from each other by an acute angle.

2. Drilling head, according to claim 1, characterized in that the adjustable support and displacement assembly (5) for the tool (6) is constituted by a cylindrical piston (9) slidably mounted with very close tolerance in a cylindrical bore extending perpendicular to the axis of the body (1) near its forward end, and actuated by means of a micrometer screw of fine thread (10), which at an end thereof remote from the tool (6) is provided with a broad head (11) with inclined flanks, whose center is provided with a polygonal operating socket, and whose inclined flank has graduations cooperating with graduations provided on a flat (12) on the body (1), and, at its other end, cooperates with a nut (13) secured to the piston (9) by cementing, a point screw (14) passing through said piston (9) and contacting said nut (13) to ensure the final gripping of said nut (13), this nut (13) being positioned in the piston (9) by means of a stop (15) which contacts said nut (13) and also closes the opening of the nut opposite the screw of fine thread (10) as well as a hole in which is disposed a plate carrier (16) of the tool (6) in the form of a bit by means of a screw (17) and a gasket (18).

3. Drilling head, according to claim 2, characterized in that at said other end, the piston (9) is provided with a groove (27) in which is disposed a plat carrier (16), which is maintained applied during its work against a recess (28) provided in the free end of the body (1), and means fixing and centering the plate carrier (16) in the piston (9).

4. Drilling head according to claim 2, characterized in that the piston (9) is in the form of a member with a round shank, the screw (10) coacting with a nut fixed on the end of the piston remote from the tool (6).

5. Drilling head according to claim 1, in which said assembly screw has an axis of rotation that coincides with the first mentioned axis.

6. Drilling head according to claim 1, in which said holes (8) are twelve in number and are spaced apart by 30°.

7. Drilling head comprising a body (1) mounted on a support (2) which is provided with a securement shank to which support said body is rigidly secured by an assembly screw (3), indexing means (4) for selectively interconnecting said body and said support in any selected one of a plurality of predetermined positions of rotation relative to each other, said predetermined positions of rotation being spaced apart from each other by an acute angle, and an adjustable support and displacement assembly (5) for a cutting tool (6), said assembly being mounted on said body for movement relative to said body in a direction perpendicular to the axis of rotation of the body and support relative to each other, the adjustable support and displacement assembly (5) for the tool (6) comprising a piston (9) slidably mounted with very close tolerance in a bore extending perpendicular to the axis of the body (1) near its forward end, and actuated by means of a micrometer screw of fine thread (10), which at an end thereof remote from the tool (6) is provided with a broad head (11) with inclined flanks, whose center is provided with a polygonal operating socket, and whose inclined flank has graduations cooperating with graduations provided on a flat (12) on the body (1), and, at its other end, cooperates with a nut (13) secured to the piston (9) by cementing, a pointed screw (14) ensured its final gripping, this nut (13) being positioned in the piston (9) by means of a stop (15) also closing the opening of the nut opposite the screw (10) as well as a threaded hole in which is disposed a plate carrier (16) of the tool (6) in the form of a bit by means of a screw (17) and a gasket (18), the support of the screw (10) in the body (1) being ensured by an elastic member (19) fixed against axial movement in a groove in the bore of the body (1), by a counter nut (20) surrounding the screw, and by a cross member (21) surrounding the screw, whose thickness is slightly greater than that of the elastic member (19).

8. Drilling head, according to claim 7, characterized in that in order to avoid any play in operation, a compressible washer of the Belleville type is inserted in the mounting between the elastic member (19) and the lower surface of the head of the screw (10), with a preliminary compression, the thickness of the cross member (21) being thus equal to that of the segment (19) plus that of the compressed washer.

9. Drilling head comprising a body (1) mounted on a support (2) which is provided with a securement shank to which support said body is rigidly secured by an assembly screw (3), indexing means (4) for selectively interconnecting said body and said support in any selected one of a plurality of predetermined positions of rotation relative to each other, said predetermined positions of rotation being spaced apart from each other by an acute angel, and an adjustable support and displacement assembly (5) for a cutting tool (6), said assembly being mounted on said body for movement relative to said body in a direction perpendicular to the axis of rotation of the body and support relative to each other, said adjustable support and displacement assembly for the cutting tool including a finely threaded micrometer screw (10) for actuating a piston (9) on which the tool (6) is mounted, the piston sliding in a bore in said body (1), the bore having an internal shoulder (86), a counter nut (20') carried by the screw and engaging on the same side of the shoulder (86) as the tool, the screw (10) having a head (11) on the side of the shoulder opposite the counter nut, and a compressible washer (87) disposed between said screw head and said shoulder (86).

10. Drilling head according to claim 9, in which said counter nut (20') has a shank that engages beneath said head (11) of said screw (10).

11. Drilling head comprising a body (1) mounted on a support (2) which is provided with a securement shank to which support said body is rigidly secured by an assembly screw (3), indexing means (4) for selectively interconnecting said body and said support in any selected one of a plurality of predetermined positions of rotation relative to each other, said predetermined positions of rotation being spaced apart from each other by an acute angle, and an adjustable support and displacement assembly (5) for a cutting tool (6), said assembly being mounted on said body for movement relative to said body in a direction perpendicular to the axis of rotation of the body and support relative to each other, said adjustable support and displacement assembly comprising a pair of cylindrical pistons (9', 91) parallel to each other and disposed in side-by-side relationship in parallel cylindrical bores in said body (90), means (92) interconnecting said pistons for conjoint movement along parallel axes perpendicular to the first mentioned axis, a micrometric screw (10) for moving one of said pistons (9') along one of said parallel axes, and means (98) carried by the other said piston (91) for releasably supporting a said tool (6').

* * * * *